United States Patent
Ogasawara

(10) Patent No.: US 12,296,995 B2
(45) Date of Patent: May 13, 2025

(54) FLIGHT VEHICLE

(71) Applicant: MATSUYAMA DRONE SERVICE CORPORATION, Ehime (JP)

(72) Inventor: Hideyuki Ogasawara, Ehime (JP)

(73) Assignee: MATSUYAMA DRONE SERVICE CORPORATION, Ehime (JP)

( * ) Notice: Subject to any disclaimer, the term of this patent is extended or adjusted under 35 U.S.C. 154(b) by 352 days.

(21) Appl. No.: 17/922,491

(22) PCT Filed: Jan. 24, 2022

(86) PCT No.: PCT/JP2022/003470
§ 371 (c)(1),
(2) Date: Oct. 31, 2022

(87) PCT Pub. No.: WO2022/172793
PCT Pub. Date: Aug. 18, 2022

(65) Prior Publication Data
US 2023/0182933 A1    Jun. 15, 2023

(30) Foreign Application Priority Data
Feb. 15, 2021    (JP) ................................ 2021-065002

(51) Int. Cl.
*B64U 20/83*    (2023.01)
*B64U 10/13*    (2023.01)
(Continued)

(52) U.S. Cl.
CPC ............. *B64U 20/83* (2023.01); *B64U 10/13* (2023.01); *B64U 30/12* (2023.01); *B64U 30/293* (2023.01); *B64U 50/30* (2023.01); *B64U 50/19* (2023.01)

(58) Field of Classification Search
CPC ........ B64U 20/83; B64U 10/16; B64U 20/12; B64C 39/06
See application file for complete search history.

(56) References Cited

U.S. PATENT DOCUMENTS

| | | | |
|---|---|---|---|
| 10,618,649 B2 * | 4/2020 | Champagne, Jr. | ..... B64U 50/13 |
| 11,394,335 B1 * | 7/2022 | Szmuk | ...................... H02P 6/00 |

(Continued)

FOREIGN PATENT DOCUMENTS

| | | | | |
|---|---|---|---|---|
| CN | 112758326 A | * | 5/2021 | ............. A01K 15/02 |
| CN | 113002764 B | * | 9/2023 | ............... B64C 1/08 |

(Continued)

*Primary Examiner* — Christopher P Ellis
(74) *Attorney, Agent, or Firm* — Wenderoth, Lind & Ponack, L.L.P.

(57) ABSTRACT

A flight vehicle includes a main body arranged at a center of the flight vehicle, a controller mounted on the main body, a plurality of arms extending radially outward from the main body and being spaced apart from each other in a circumferential direction, with each arm having a motor and a propeller arranged at a radially outer tip of the arm, and wings that are separate from the main body. Each wing connects two adjacent arms of the plurality of arms, and the wings are attached at a constant distance between the main body and the propellers. The wings are positioned such that air flowing through a space between the main body and radially inner surfaces of the wings is slower than air flowing through a space between the propellers and radially outer surfaces of the wings.

5 Claims, 7 Drawing Sheets

(51) Int. Cl.
    *B64U 30/12*     (2023.01)
    *B64U 30/293*     (2023.01)
    *B64U 50/19*     (2023.01)
    *B64U 50/30*     (2023.01)

(56) References Cited

U.S. PATENT DOCUMENTS

| | | | |
|---|---|---|---|
| 11,749,122 B1* | 9/2023 | Kimchi | G05D 1/0077 |
| | | | 701/3 |
| 2016/0083073 A1* | 3/2016 | Beckman | G10K 11/17857 |
| | | | 244/1 N |
| 2016/0159472 A1* | 6/2016 | Chan | B64C 27/37 |
| | | | 244/39 |
| 2016/0355257 A1* | 12/2016 | Chappell | B64C 27/52 |
| 2016/0375997 A1* | 12/2016 | Welsh | B64C 23/069 |
| | | | 244/17.23 |
| 2017/0158320 A1* | 6/2017 | Bosch | B64U 50/14 |
| 2020/0140071 A1* | 5/2020 | Heinen | B64C 29/0033 |
| 2020/0140087 A1* | 5/2020 | Fulbright | A62C 3/0235 |
| 2020/0142090 A1* | 5/2020 | Colombo | G01V 3/17 |
| 2020/0277069 A1* | 9/2020 | Rainville | B64U 30/10 |
| 2021/0107636 A1* | 4/2021 | Seung | B64U 30/293 |
| 2022/0169380 A1* | 6/2022 | Mehrgan | B64C 29/02 |
| 2023/0322380 A1* | 10/2023 | Champagne, Jr. | G05D 1/0858 |
| | | | 244/17.13 |

FOREIGN PATENT DOCUMENTS

| | | | | |
|---|---|---|---|---|
| JP | 2017190091 A | * | 10/2017 | |
| KR | 20220074826 A | * | 12/2017 | |
| KR | 20220109514 A | * | 11/2020 | |
| WO | WO-2016067488 A1 | * | 5/2016 | B64C 27/08 |

* cited by examiner

FLIGHT VEHICLE

TECHNICAL FIELD

The present invention relates to a flight vehicle that flies by means of three or more propellers mounted facing upward or downward (hereinafter referred to as a multicopter).

BACKGROUND TECHNOLOGY

Conventional multicopters have not generally had wings.

PRIOR ART

Patent Literature

Patent Literature 1: Publication Bulletin for Unexamined Patent Application 2017-109512
Patent Literature 2: Patent Application 2019-189768

SUMMARY OF THE INVENTION

Problem the Present Invention Aims to Solve

Recently, jobs involving transporting goods, tasks involving surveying a wide area, etc. using multicopters have increased, and it has become necessary for multicopters to fly for long periods of time.

To enable the multicopters to do this, it has been necessary to increase the battery capacity or structurally increase the lift in order to support the motors' output.

Means for Solving the Problem

In order to solve the aforementioned problem, according to a first aspect of the invention, wings that are separate from the multicopter main body are provided all the way around or at individual locations around it to connect all or some of the neighboring pairs of multiple arms extending radially from it. The wings are placed between the main body and the arm folding hinges for the arms. They are at a distance S1 from the main body, and attached to the arms close to the propellers.

According to a second aspect of the invention, the batteries are mounted inside the wings described in the first aspect of the invention. According to a third aspect of the invention, the wings can be tilted toward the direction that the multicopter is traveling in, in order to reduce the angle of attack and increase the multicopter's speed. Furthermore, according to a fourth aspect of the invention, besides the cross sections that are already in practical use as airfoils, those of the wings also include approximated ones such as ellipses and polygons.

Effect of the Invention

The present invention will enable multicopters' flight times to be extended without increasing the battery capacity, etc.

DETAILED DESCRIPTION OF THE INVENTION

Figure 1:
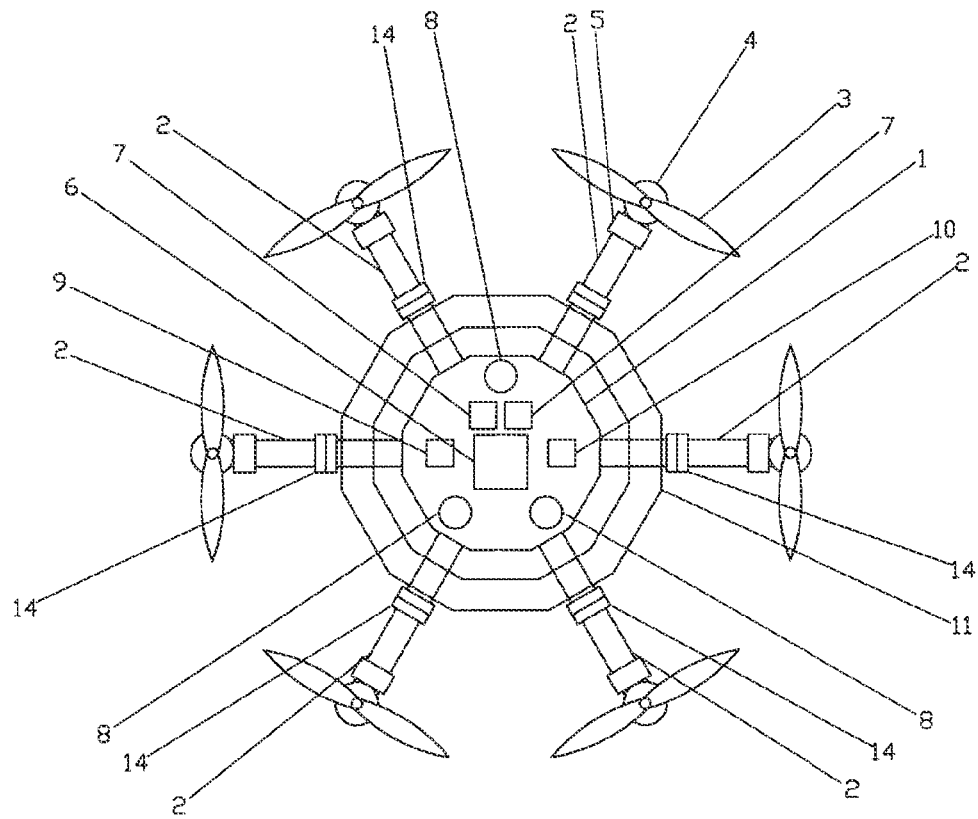
FIG. 1 is a top view of a multicopter (with six propellers).
Figure 2:
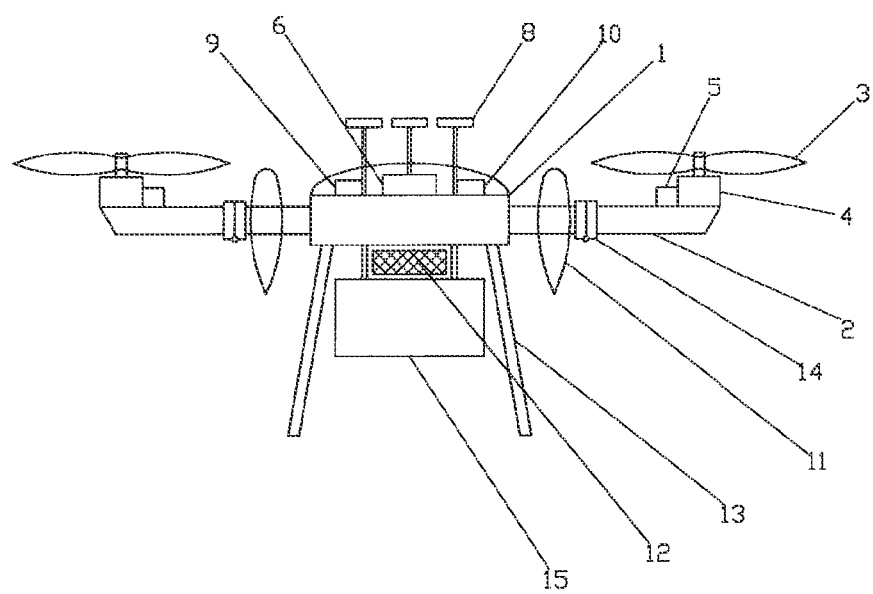
FIG. 2 is a vertical cross section of a multicopter (with six propellers).

FIGS. 1 and 2 show an example implementation with a multicopter with six arms, six propellers, and six motors. At the center of the multicopter is its main body 1 where the controller is mounted, and extending radially from that are the arms 2. Each of the arms 2 has a propeller 3, motor 4, and an electronic speed controller (ESC 5) attached at its tip and an arm folding hinge 14 in the middle of it. The hinges enable the arms 2 to be folded so that the multicopter can be transported more compactly.

Attached between the multicopter main body 1 and arm folding hinges 14 are wings 11, which are separate from the multicopter main body 1.

The wings 11 are fixed to the arms 2.

The wings 11 are provided for the radial arms 2 all the way around, or for multiple neighboring pairs of them.

Figure 3:
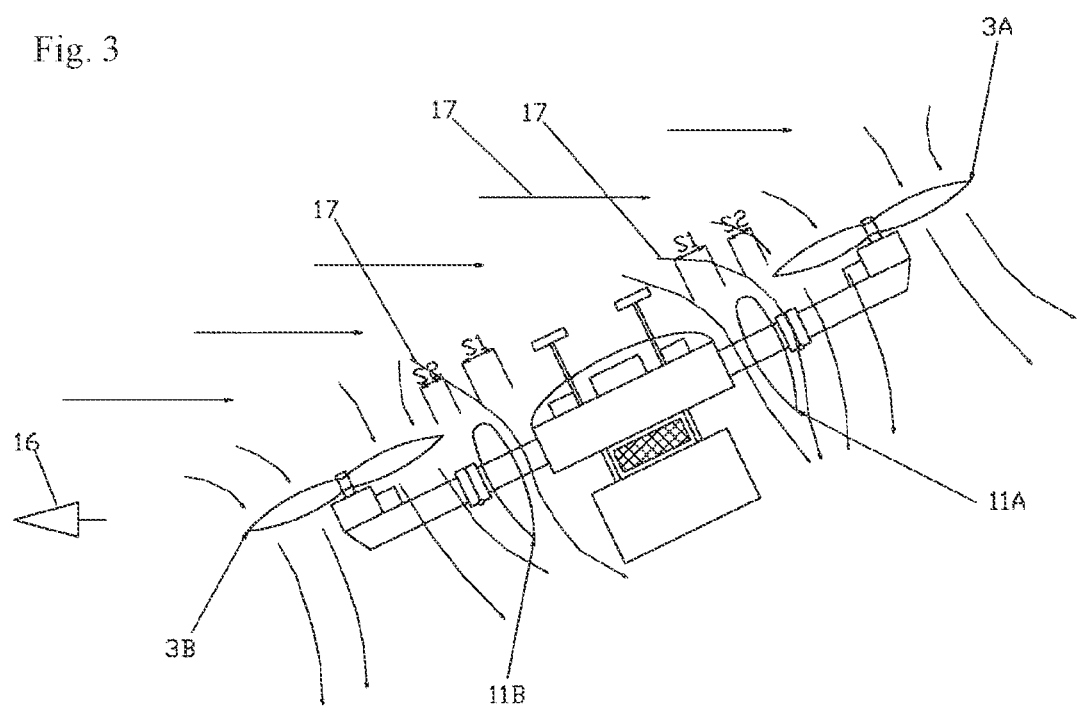
FIG. 3 shows an air flow when the multicopter is moving forward.

FIG. 3 shows the present invention actually in use on a multicopter.

It shows the air flow when the multicopter is moving forward, and that because the propellers are rotating on the outer side of the wings, the air flow there is fast, and the resulting slipstream pulls in the air flow on the inner side so that it does not separate off.

The angle of attack of the wings 11 increases when the multicopter tilts forward to move forward, and if it continues to move forward, air flows in around it. However, on the higher side of the multicopter main body 1, the rotation of propeller 3A on the outer side of wing 11A creates a slipstream that speeds up the air flow so that it does not separate off even if the angle of attack is large. The air flowing through space S1 between the multicopter main body 1 and wing 11A is moving slower than that flowing through the outer space S2 between wing 11A and propeller 3A. The difference between the flow speeds generates upward lift. Similarly, on the opposite, lower side of the multicopter main body 1, propeller 3B is rotating on the outer side of wing 11B, and the slipstream created by it is flowing through space S2. Here, the air flowing through space S1 on the inner side of wing 11B is also moving slower than that on the outer side, and would ordinarily separate off due to the large angle of attack. However, close to wing 11B on its outer side (S2 side) there is propeller 3B, and the slipstream created by it pulls in the air flow so that it does not separate off. The difference between the flow speeds generates downward lift. In this way, the propeller slipstream lifts generated at the front and back offset each other, the ones generated on the left and right do likewise, and lift is generated by the influx of air due to the multicopter's forward movement.

Furthermore, because the air flow does not separate off from the wings 11, the multicopter can fly with less resistance. Using this lift to offset the multicopter's weight makes it lighter. This in turn enables it to fly for a longer time by reducing the resistance to it, the load on its motors, and the electricity it consumes. Similarly, when the multicopter is hovering, since the propellers 3 are on the outer side (S2 side) of the wings 11, lifts are constantly generated on the outer side (S2 side). However, the lifts generated at the front and back offset each other and the ones generated on the left and right do likewise. As a result, the multicopter can be kept stationary.

This enables the flight time of the multicopter to be extended by approximately 20%.

The multicopter is flown with the wings 11 at a large angle of attack, but when it is flying slowly, the resulting resistance is small and not much of a problem. However, as the flight speed increases, the resistance will as well. To reduce the resistance therefore, the wings can be tilted toward the multicopter's direction of travel, to an extent that will not affect its hovering capability.

Figure 4:
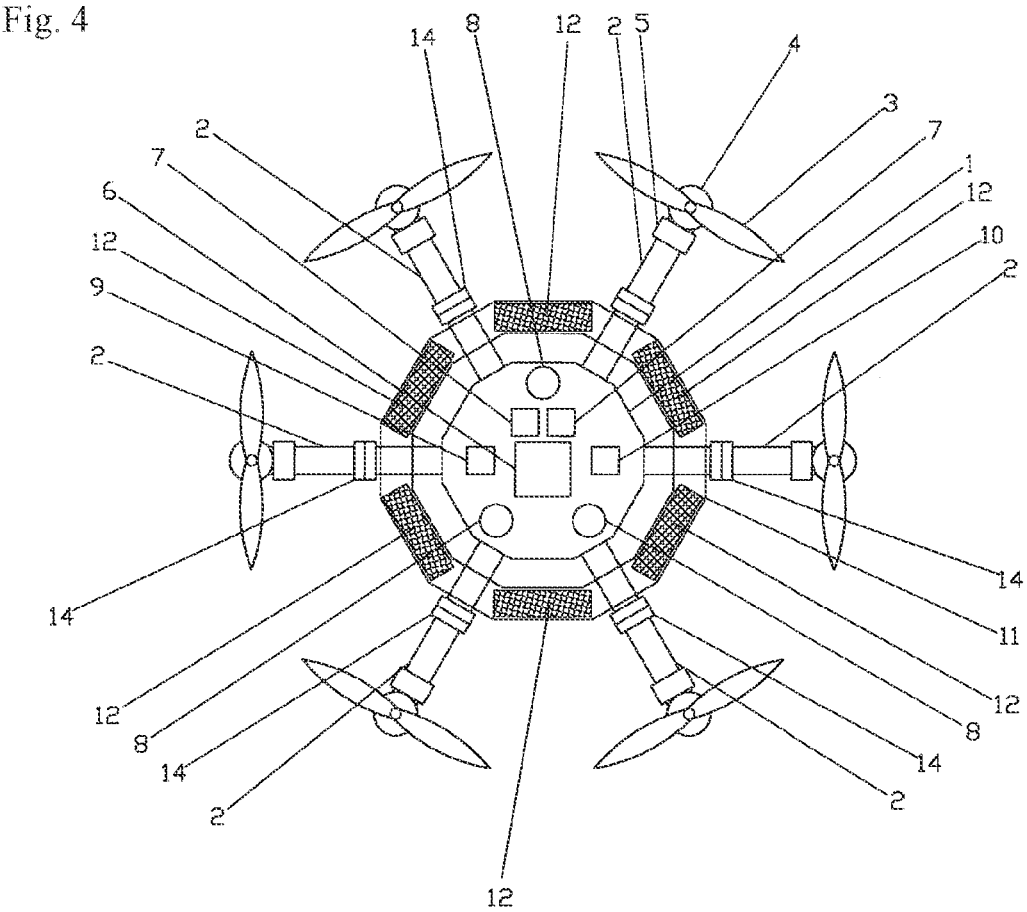
FIG. 4 is a top view showing an example with the batteries mounted inside the wings (with six propellers).
Figure 5:
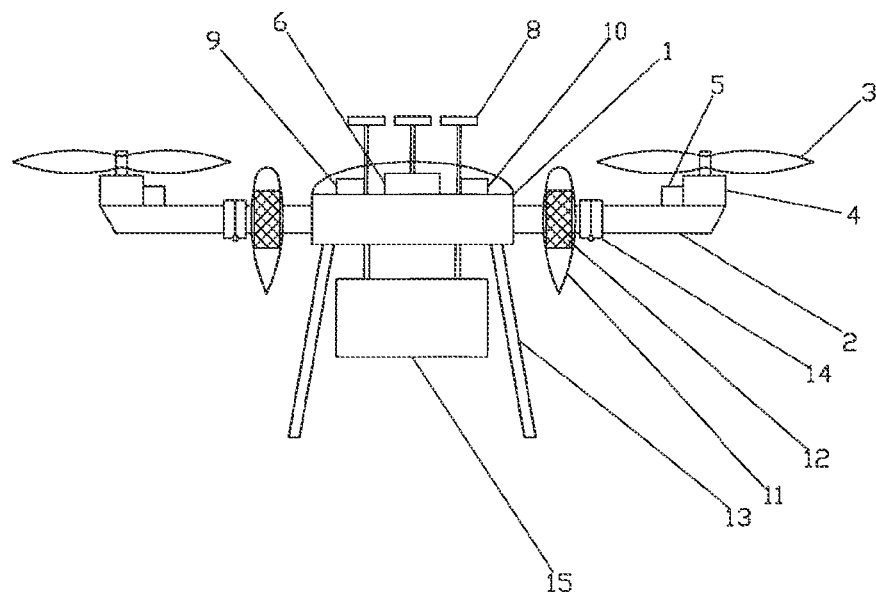
FIG. 5 is a vertical cross section showing an example with the batteries mounted inside the wings (with six propellers).

FIGS. 4 and 5 show an example of mounting the batteries using the empty spaces in the wings.

Figure 6:
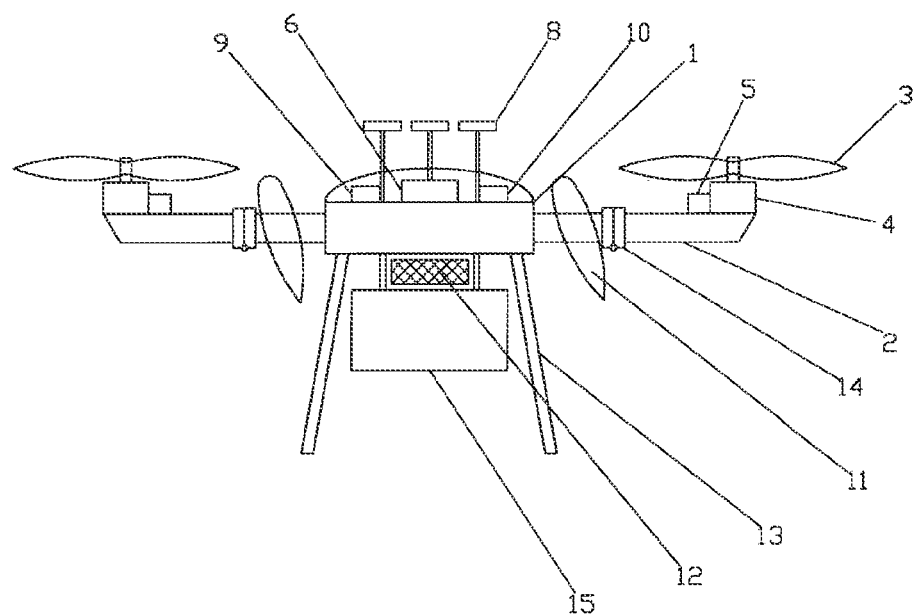
FIG. 6 is a vertical cross section showing an example with the wings tilted toward the direction of travel.
Figure 7:
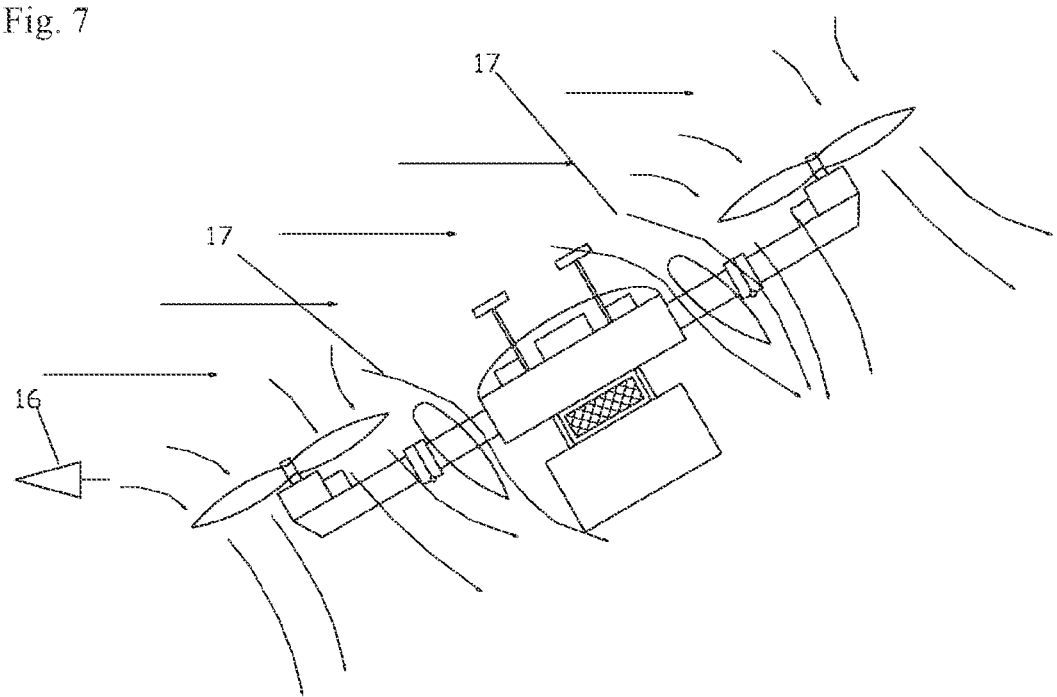
FIG. 7 shows an air flow when the multicopter is moving forward with the wings tilted toward the direction of travel.

FIGS. 6 and 7 show an example of reducing the wings' angle of attack so that they generate less resistance. Reducing the angle of attack will enable the speed to be increased further. The angle can also be made automatically variable.

Figure 8:
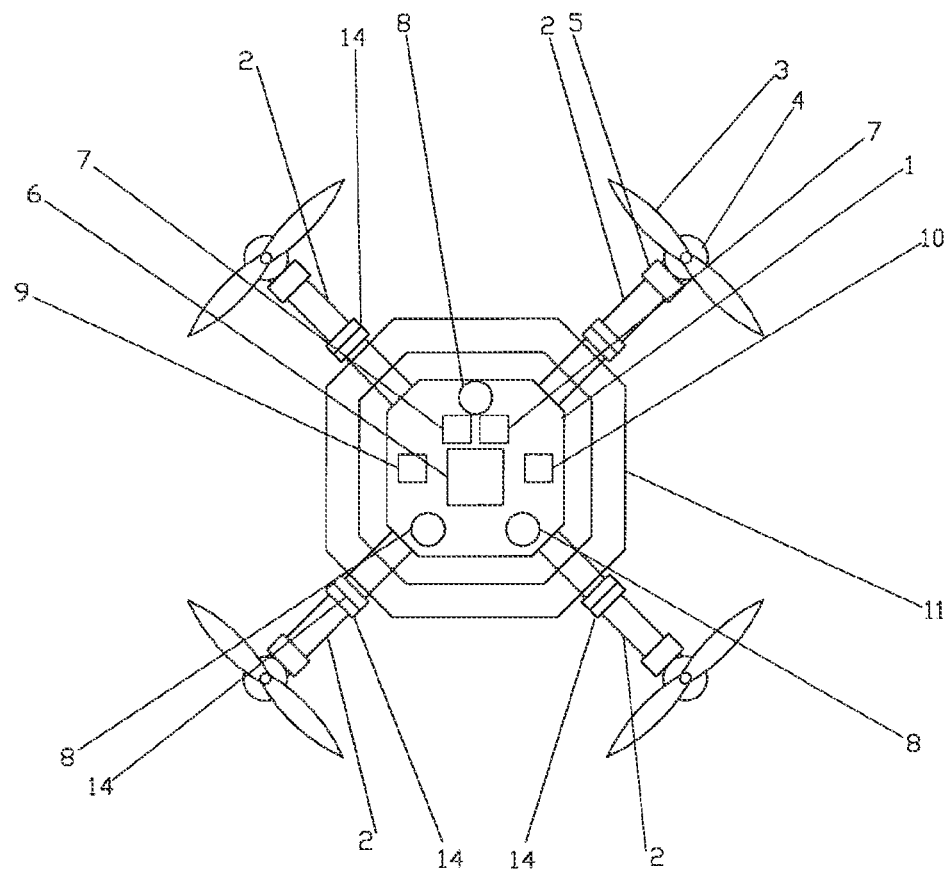
FIG. 8 is a top view of a multicopter with four propellers.
Figure 9:
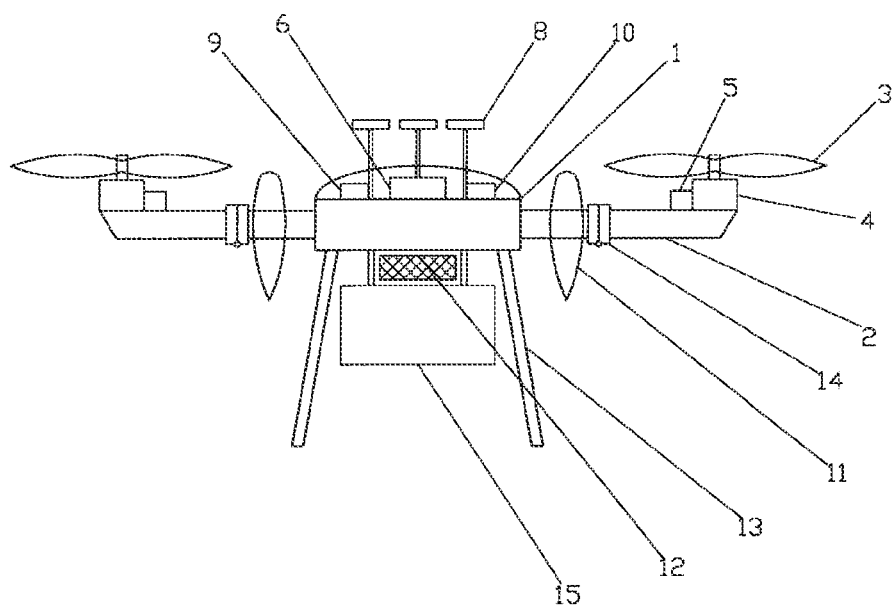
FIG. 9 is a vertical cross section of a multicopter with four propellers.

FIGS. 8 and 9 show an example application when there are four propellers.

Figure 10:
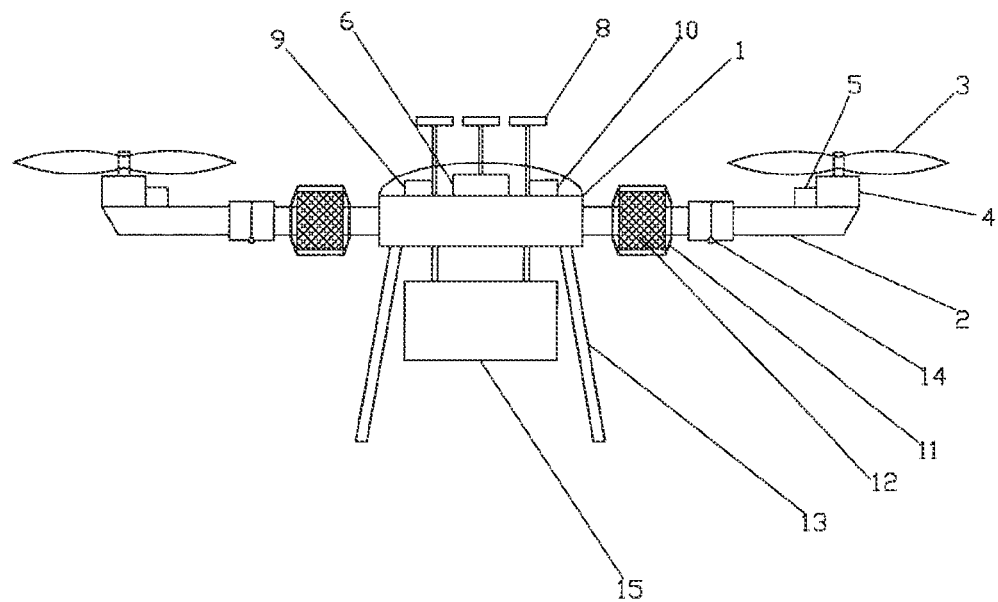
FIG. 10 shows an example with polygonal wings.

FIG. 10 shows an example application where the wings have a polygon cross section that can easily accommodate the batteries. Sufficient lift can be generated even if they are polygonal. Furthermore, besides the cross sections that are already in practical use as airfoils, those of the wings 11 also include approximated ones such as ellipses and polygons.

Figure 11:
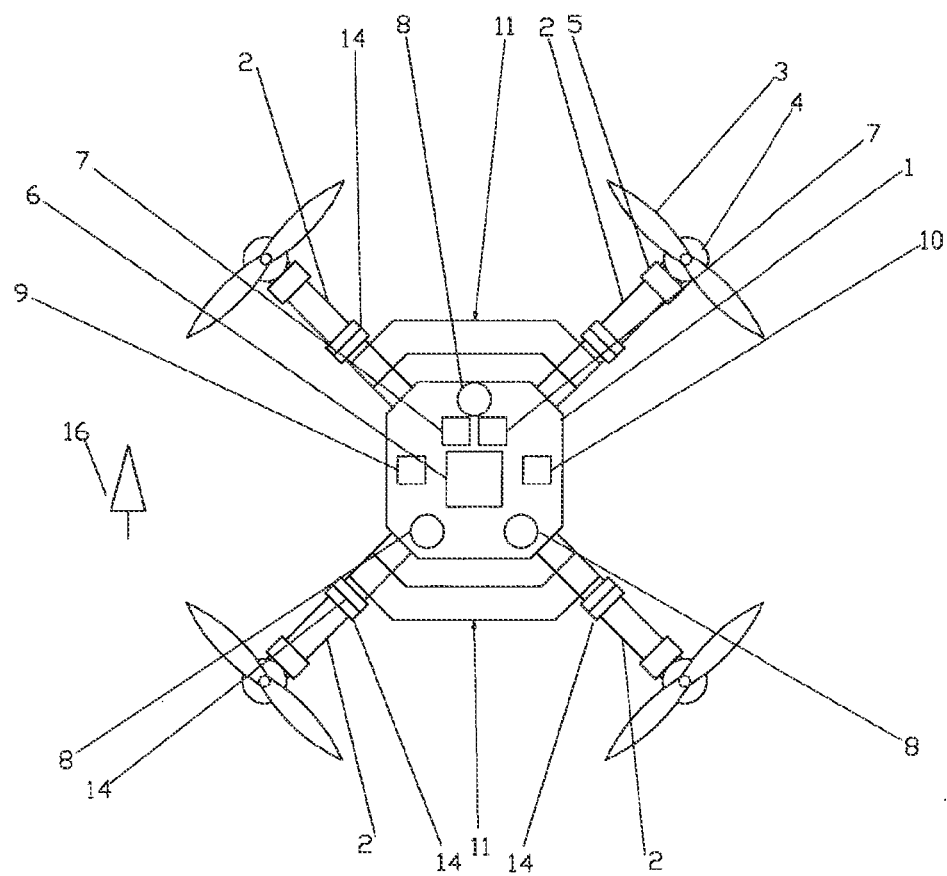
FIG. 11 shows and example with wings placed only between two arbitrary pairs of arms at the front and back relative to the direction of travel.

FIG. 11 shows an example in which the wings 11 are placed between two arbitrary pairs of arms. The effect is sufficient even if the wings 11 are not placed between all the arms, but only an arbitrary pair at the front and back relative to the direction of travel.

Figure 12:
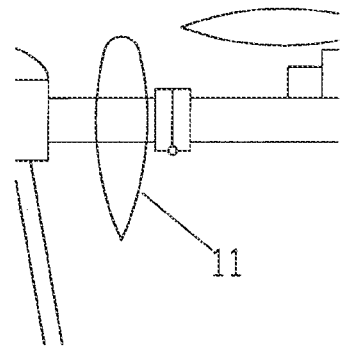
FIG. 12 shows an example of the detailed cross section of a wing.

FIG. 12 shows an example cross section of a wing.

Figure 13:
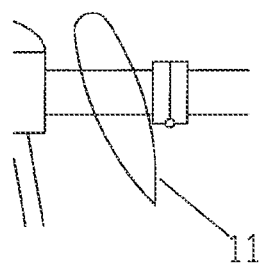
FIG. 13 shows an example of the detailed cross section of a wing tilted toward the direction of travel.

FIG. 13 shows an example cross section of a wing that has been tilted forward.

Figure 14:
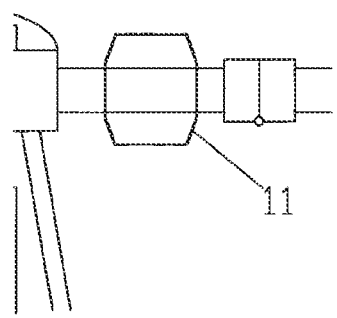
FIG. 14 shows an example of the detailed cross section of a polygonal wing.

FIG. 14 shows an example cross section of a polygonal wing.

DESCRIPTION OF THE LABELS

1 Multicopter main body
2 Arm
3 Propeller
3A Propeller on higher side
3B Propeller on lower side
4 Motor
5 ESC (Motor controller)
6 Main controller
7 Secondary controller
8 GPS antenna
9 Receiver
10 Video transmitter
11 Wing
11A Wing on higher side
11B Wing on lower side
12 Battery
13 Leg
14 Arm folding hinge
15 Camera, measuring device, transportation case, etc.
16 Multicopter's direction of travel
17 Air flow around multicopter
18 Wing tilted forward
S1: Space between main body and wing
S2: Space between wing and propeller

The invention claimed is:

1. A flight vehicle comprising:
a main body arranged at a center of the flight vehicle;
a controller mounted on the main body;
a plurality of arms extending radially outward from the main body and being spaced apart from each other in a circumferential direction, each arm having a motor and a propeller arranged at a radially outer tip of the arm; and
wings that are separate from the main body, each wing connecting two adjacent arms of the plurality of arms, wherein the wings are attached at a constant distance between the main body and the propellers,
wherein the wings are positioned such that air flowing through a space between the main body and radially inner surfaces of the wings is slower than air flowing through a space between the propellers and radially outer surfaces of the wings during flight of the flight vehicle.

2. The flight vehicle according to claim 1, wherein each pair of adjacent arms of the plurality of arms are connected by a respective one of the wings such that the wings extend around an entirety of the main body relative to the circumferential direction.

3. The flight vehicle according to claim 1, further comprising batteries mounted inside the wings, respectively.

4. The flight vehicle according to claim 1, wherein each wing is configured to tilt toward a direction of travel of the flight vehicle.

5. The flight vehicle according to claim 1, wherein a cross-sectional shape of each wing is an ellipse or a polygon.

* * * * *